(12) United States Patent
Morris (10) Patent No.: US 7,069,269 B2
(45) Date of Patent: Jun. 27, 2006

(54) METHOD, SYSTEM AND PROGRAM PRODUCT FOR MAPPING DATA FIELDS BETWEEN A DATA SOURCE AND A DATA TARGET

(75) Inventor: Scott R. Morris, Durham, NH (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 10/308,531

(22) Filed: Dec. 3, 2002

(65) Prior Publication Data

US 2004/0107201 A1 Jun. 3, 2004

(51) Int. Cl.
*G06F 17/30* (2006.01)
(52) U.S. Cl. ..................... 707/101; 707/201
(58) Field of Classification Search ............... 707/101, 707/201, 204, 103 R
See application file for complete search history.

(56) References Cited

U.S. PATENT DOCUMENTS

| | | | | |
|---|---|---|---|---|
| 5,392,390 A | * | 2/1995 | Crozier | 715/762 |
| 5,561,793 A | * | 10/1996 | Bennett et al. | 707/201 |
| 5,684,990 A | * | 11/1997 | Boothby | 707/203 |
| 5,729,665 A | | 3/1998 | Gauthier | |
| 5,761,671 A | | 6/1998 | Blackman et al. | |
| 5,943,676 A | * | 8/1999 | Boothby | 707/201 |
| 5,966,717 A | * | 10/1999 | Sass | 707/204 |
| 6,029,160 A | | 2/2000 | Cabrera et al. | |
| 6,044,381 A | * | 3/2000 | Boothby et al. | 707/201 |
| 6,076,090 A | | 6/2000 | Burroughs et al. | |
| 6,154,748 A | * | 11/2000 | Gupta et al. | 707/102 |
| 6,230,157 B1 | * | 5/2001 | Malcolm et al. | 707/100 |
| 6,279,008 B1 | | 8/2001 | Ng et al. | |
| 6,408,302 B1 | * | 6/2002 | Lee et al. | 707/102 |
| 6,460,048 B1 | * | 10/2002 | Teng et al. | 707/103 R |
| 6,496,835 B1 | * | 12/2002 | Liu et al. | 707/102 |
| 6,609,133 B1 | * | 8/2003 | Ng et al. | 707/103 Y |
| 2001/0014890 A1 | * | 8/2001 | Liu et al. | 707/102 |
| 2002/0089681 A1 | | 7/2002 | Gauthier | |
| 2003/0225742 A1 | * | 12/2003 | Tenner et al. | 707/2 |

FOREIGN PATENT DOCUMENTS

WO    WO 00/62191    10/2000

OTHER PUBLICATIONS

Research Disclosure 446167, "Legacy Data Encapsulator", Jun. 2001, p. 1049.

* cited by examiner

*Primary Examiner*—Uyen Le
*Assistant Examiner*—Michael Le
(74) *Attorney, Agent, or Firm*—Stephen T. Keohane; Hoffman, Warnick & D'Alessandro LLC

(57) ABSTRACT

An input stream in which a data source, a data target, source data fields and target data fields is defined. Any field identifier that is identical to another field identifier is modified to be unique. Once the field identifiers are modified as necessary, the source data fields will be mapped to the target data fields based on the field identifiers. After mapping, the field identifiers will be changed back to their original state, and data associated with the source data fields will be communicated to the data target.

27 Claims, 4 Drawing Sheets

METHOD, SYSTEM AND PROGRAM PRODUCT FOR MAPPING DATA FIELDS BETWEEN A DATA SOURCE AND A DATA TARGET

BACKGROUND OF THE INVENTION

1. Field of the Invention

The present invention generally relates to a method, system and program product for mapping data fields between a data source and a data target. Specifically, the present invention provides a non-programmatic way to map data fields when the data source or the data target fail to adopt a flat data model.

2. Background Art

As the use of computer technology becomes more prevalent, application software is constantly being developed to help individuals and business to perform tasks more efficiently. One type of useful software is known as an Enterprise Resource Planning (ERP) system, which helps a manufacturer or other business manage the important parts of its business, including product planning, parts purchasing, maintaining inventories, interacting with suppliers, providing customer service, and tracking orders. An ERP system can also include application modules for the finance and human resources aspects of a business. Typically, an ERP system receives data from a data source such as a relational database system. As known, a relational database is a collection of data items organized as a set of formally-described tables from which data can be accessed or reassembled in many different ways without having to reorganize the database tables. The standard user and application program interface to a relational database is the structured query language (SQL). To this extent, a relational database generally utilizes a flat data model. Specifically, the names or identifiers of data fields in a relational database are unique so that a particular field name will not occur multiple times.

A common task performed by a user is to communicate data (e.g., replicate, transfer, etc.) between the relational database (i.e., the data source) and the ERP system (i.e., the data target). When communicating data, not only must the user identify the data source and the data target, but the user must also identify the specific source data fields from which the data is drawn and the target data fields to which the data will be provided. Then, the user must map the identified source data fields to the target data fields so that the data will be communicated to the correct fields. Once the data fields are mapped, a tool generally known as an "enterprise integration tool" will facilitate the communication of the data between the data source and the data target.

Unfortunately, many ERP systems, such as SAP R/3, are not adapted to function like a relational database. For example, an EPR system's interfaces may not utilize SQL. Moreover, the ERP system might fail to utilize a flat data model. When failing to adopt a flat data model, a single field name can occur multiple times. Thus, when the user attempts to map the source data fields to the target data fields he/she may be presented with a target field name that appears multiple times. As such, the user may be unable ascertain which target data field should be mapped to a particular source data field.

In view of the foregoing, there exists a need for a method, system and program product for mapping data fields between a data source and a data target. Specifically, a connector tool is needed that accommodates data sources and/or data targets that fail to utilize a flat data model so that source data fields can be accurately mapped to target data fields.

SUMMARY OF THE INVENTION

In general, the present invention provides a method, system and program product for mapping data fields between a data source and a data target. Specifically, under the present invention, a user defines an input stream that identifies a data source, a data target, source data fields and target data fields. Once the input stream is defined, any target field identifiers (e.g., target field names) that occur more than once are modified so that they are unique. After being modified, the user will map the source data fields to the target data fields based on the field identifiers. Once mapping is complete, any modified field identifiers will be returned to their original state, and the data corresponding to the source data fields will be communicated to the data target.

According to a first aspect of the present invention, a method for mapping data fields between a data source and a data target is provided. The method comprises: (1) providing an input stream, wherein the input stream identifies the data source, the data target, and a set of data fields; (2) modifying a field identifier for each one of the set of data fields that has a field identifier in common with another one of the set of data fields; (3) mapping the set of data fields between the data source and the data target; and (4) returning each modified field identifier to an original state.

According to a second aspect of the present invention, a method for non-programmatically mapping data fields between a data source and a data target is provided. The method comprises: (1) providing an input stream, wherein the input stream identifies the data source, the data target, source data fields and target data fields; (2) modifying a field identifier for each one of the target data fields that has a field identifier in common with another one of the target data fields; (3) graphically mapping the source data fields to the target data fields after the modifying step; and (4) returning each modified field identifier to an original state after the graphically mapping step.

According to a third aspect of the present invention, a system for non-programmatically mapping data fields between a data source and a data target is provided. The system comprises: (1) an input system for receiving an input stream, wherein the input stream identifies the data source, the data target, source data fields and target data fields; and (2) a modification system for modifying a field identifier for each one of the target data fields that has a field identifier in common with another one of the target data fields, wherein a modified stream containing each modified field identifier is communicated to a system for graphically mapping the source data fields to the target data fields, and wherein each modified field identifier is returned to an original state after the source data fields are mapped to the target data fields.

According to a fourth aspect of the present invention, a system for mapping data fields between a data source and a data target is provided. The system comprises: (1) a definition system for defining an input stream, wherein the input stream identifies the data source, the data target, source data fields and target data fields; (2) a connector system for receiving the input stream and for modifying a field identifier for each one of the target data fields that has a field identifier in common with another one of the target data fields; (3) a mapping system for receiving a modified input stream that includes each modified field identifier and for mapping the source data fields to the target data fields; and (4) an activity system for receiving the modified input stream and the mapping of the source data fields to the target data fields, wherein the activity system communicates the modified input stream, the mapping of the source data fields to the target data fields and data associated with the source data fields to the connector system, and wherein the connector system returns each modified field identifier to an original state after the source data fields are mapped to the target data fields.

According to a fifth aspect of the present invention, a program product stored on a recordable medium for non-programmatically mapping data fields between a data source and a data target is provided. When executed, the program product comprises: (1) program code for receiving an input stream, wherein the input stream identifies the data source, the data target, source data fields and target data fields; and (2) program code for modifying a field identifier for each one of the target data fields that has a field identifier in common with another one of the target data fields, wherein a modified stream containing each modified field identifier is communicated to program code for graphically mapping the source data fields to the target data fields, and wherein each modified field identifier is returned to an original state after the source data fields are mapped to the target data fields.

According to a sixth aspect of the present invention, a program product stored on a recordable medium for non-programmatically mapping data fields between a data source and a data target is provided. When executed, the program product comprises: (1) program code for defining an input stream, wherein the input stream identifies the data source, the data target, source data fields and target data fields; (2) program code for receiving the input stream and for modifying a field identifier for each one of the target data fields that has a field identifier in common with another one of the target data fields; (3) program code for receiving a modified input stream that includes each modified field identifier and for mapping the source data fields to the target data fields; and (4) program code for receiving the modified input stream and the mapping of the source data fields to the target data fields, wherein each modified field identifier is returned to an original state after the source data fields are mapped to the target data fields.

Therefore, the present invention provides a method, system and program product for mapping data fields between a data source and a data target.

BRIEF DESCRIPTION OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for mapping data fields between a data source and a data target. Specifically, under the present invention, a user defines an input stream that identifies a data source, a data target, source data fields and target data fields. Once the input stream is defined, any target field identifiers (e.g., target field names) that occur more than once are modified so that they are unique. After being modified, the user will map that source data fields to the target data fields based on the field identifiers. Once mapping is complete, any modified field identifiers will be returned to their original state, and the data corresponding to the source data fields will be communicated (e.g., replicated, transferred, etc.) to the data target.

Figure 1:
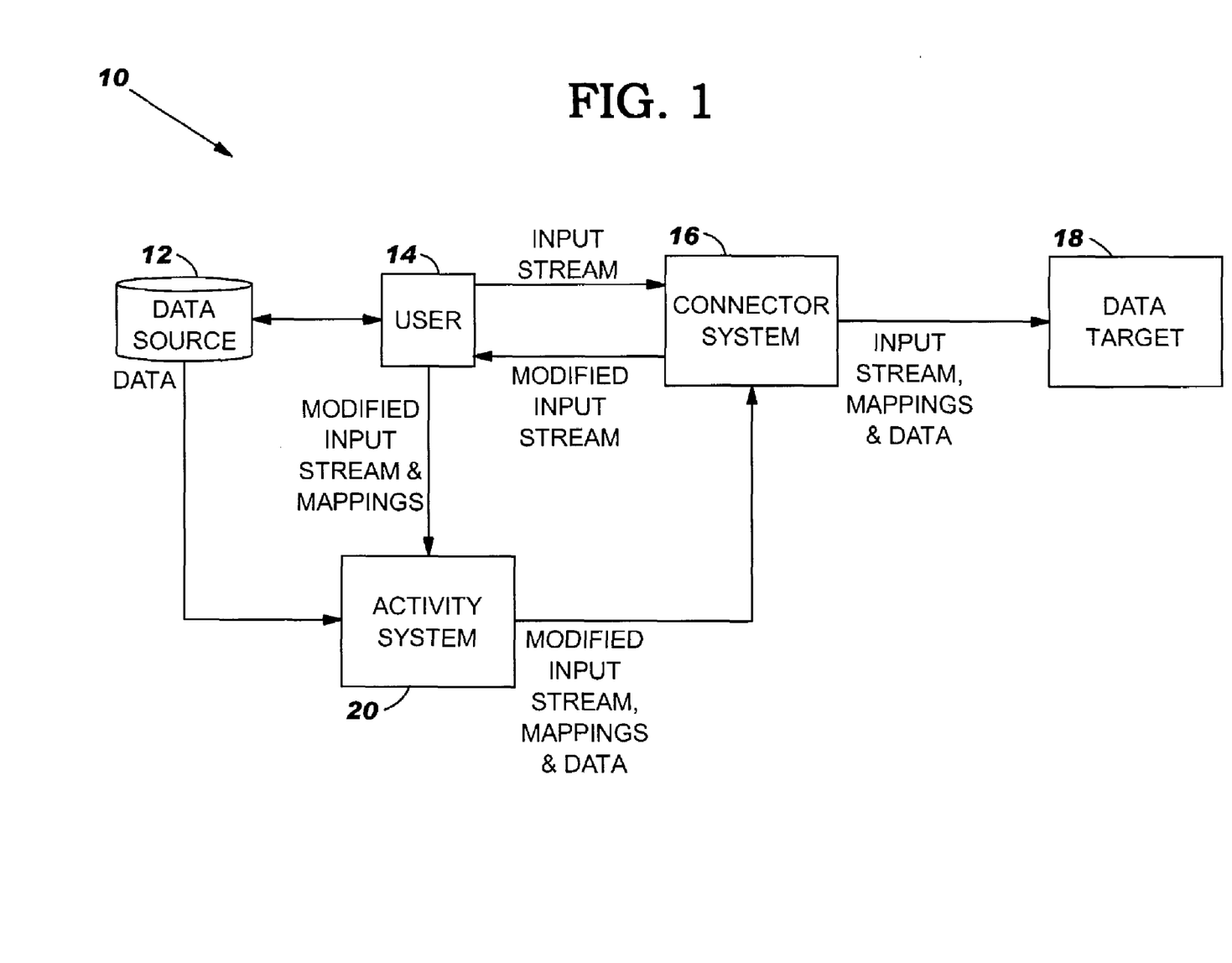
FIG. 1 depicts a system for mapping data fields between a data source and a data target according to the present invention.

Referring now to FIG. 1, system 10 for mapping data fields between data source 12 and data target 18 is provided. In a typical embodiment, data source 12 is intended to represent any source of data that is utilizes a flat data model. For example, data source 12 can be a database such as DB2, LOTUS NOTES, ORACLE, etc. Moreover, data target 18 is intended to represent any target of data that utilizes a non-flat data model. For example, data target can be any ERP system such as SAP R/3, etc. However, it should be appreciated that the teachings of the present invention could be applied to any type of data source and data target. Moreover, the teachings of the present invention could be applied to a data source that utilizes a non-flat data model and a data target that utilizes a flat data model. It should also be appreciated that although the teachings of the present invention will be described in the context of communicating data from data source 12 to data target 18, any flow direction could be accommodated hereunder.

Under the present invention, user 14 will first define an input stream and an activity for communicating data between data source 12 and data target 18. To this extent, user 14 will typically have access to software corresponding to both data source 12 and data target 18. Moreover, user 14 could have access to data source 12. In general, the input stream defined by user 14 specifically identifies data source 12, data target 18, one or more source data fields and one or more target data fields. Identification of data fields can be done in any manner. For example, source data fields can be identified based on specific screens and data fields that appear based on the data source software. An illustration of such identification is as follows:

---

Screen 1
    Field 1
    Field 2
Screen 1
    Field 1
    Field 2
Screen 3
    Field 1

---

As shown, for one reason or another, the same fields within the same screen could be identified more than once. That is, a particular data field could have more than one instance. However, if data source 12 adopts a flat data model, none of the fields will have a common field identifier (i.e., field name). Thus, even though the fields 1 and 2 for screen 1 are identified multiple times, they will have distinct identifiers when user 14 later performs a mapping. In identifying target data fields, user 14 will typically identify the specific target data field identifiers that correspond to the identified source data fields. Unfortunately, if data target 18 adopts a non-flat data model, user 14 may identify multiple instances of the same target field identifiers. For example, user 14 may identify the following target data fields:

RF02D-KUNNR
KNA1-STRAS
RF02D-KUNNR
KNA1-STRAS
KNA 1-TELFX

Figure 2:
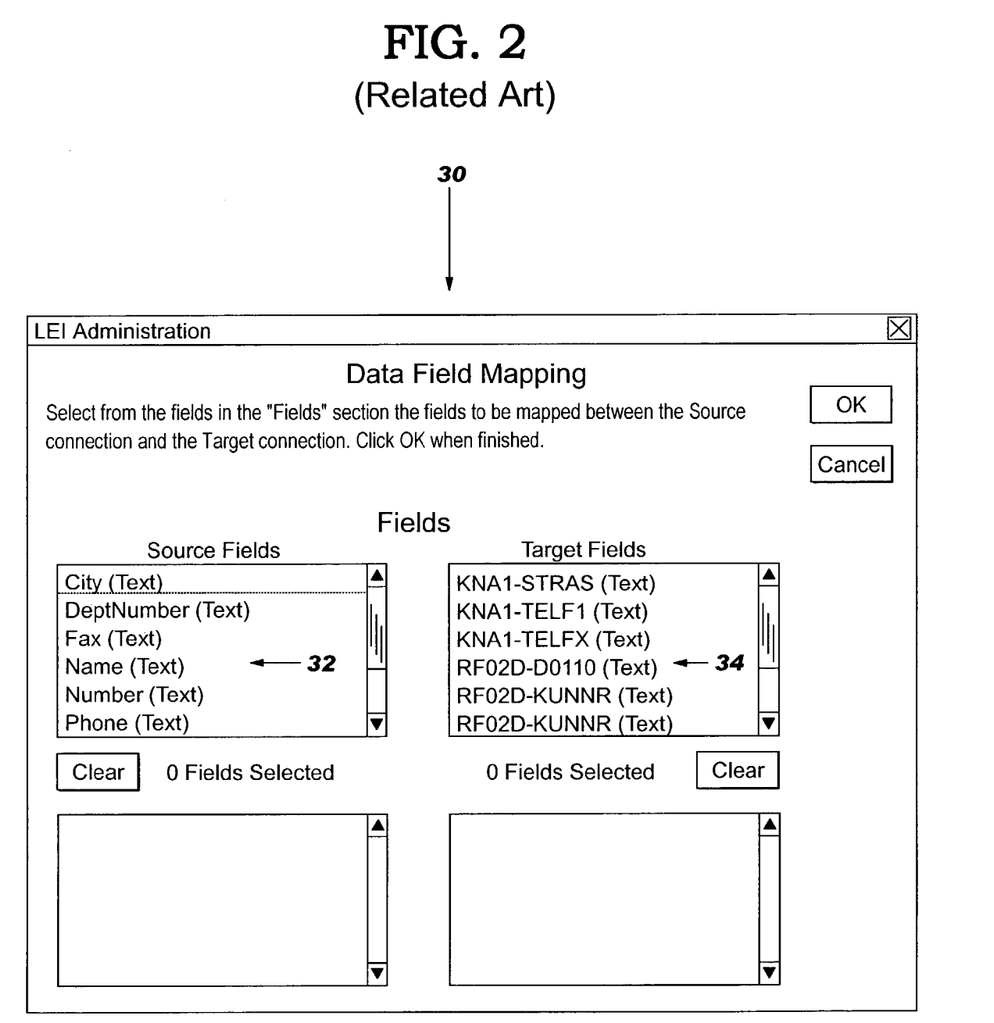
FIG. 2 depicts a related art mapping interface.

As can be seen there are two instances of the target data field identifier "RF02D-KUNNR." Under related art inventions, such multiplicity would pose problems when user 14 later maps the source data fields to the target data fields. Referring to FIG. 2, a related art mapping interface 30 is shown. As depicted, mapping interface 30 includes source data field identifiers 32 and target data field identifiers 34. Using a mouse or other input device, user 14 can map a particular source data field to a target data field by selecting their respective identifiers. Once a source data field is mapped to a target data field, data associated with the source data field can be communicated to the target data field. Unfortunately, as shown in FIG. 2, at least one target data field identifier, RF02D-KUNNR, appears twice. There is no way for user 14 to know whether this was the first instance or the second instance of the target data field as identified in the input stream. In addition, because many mapping programs fail to list the data field identifiers in a specific order, user 14 cannot glean any insight from the order in which target data field identifiers 34 are listed. Accordingly, there is a high likelihood that user could map a source data field to the wrong target data field.

Referring back to FIG. 1, the present invention addresses this problem. Specifically, once user 14 has defined the input stream, it will be provided to connector system 16. In general, connector system 16 represents any type of enterprise integration tool that facilitates the communication of data between systems. Once the input stream is received, connector system 16 will review the field identifiers for the identified data fields. Then, connector system 16 will modify the field identifier for any data field that is in common with that of another data field. Specifically, if more than one data field has the same/identical field identifier, connector system 16 will modify each to be unique and to reflect its particular instance. In a typical embodiment, connector system 16 modifies the field identifiers by inserting a value reflective of the field identifiers' instances. For example, the common field identifiers "RF02D-KUNNR" (first instance) and "RF02D-KUNNR" (second instance) can be changed to "1*RF02D-KUNNR" and "2*RF02D-KUNNR," respectively. Once modified, connector system 16 will communicate a modified input stream containing all modified and unmodified field identifiers back to user 14 who can then perform the mapping.

Figure 3:
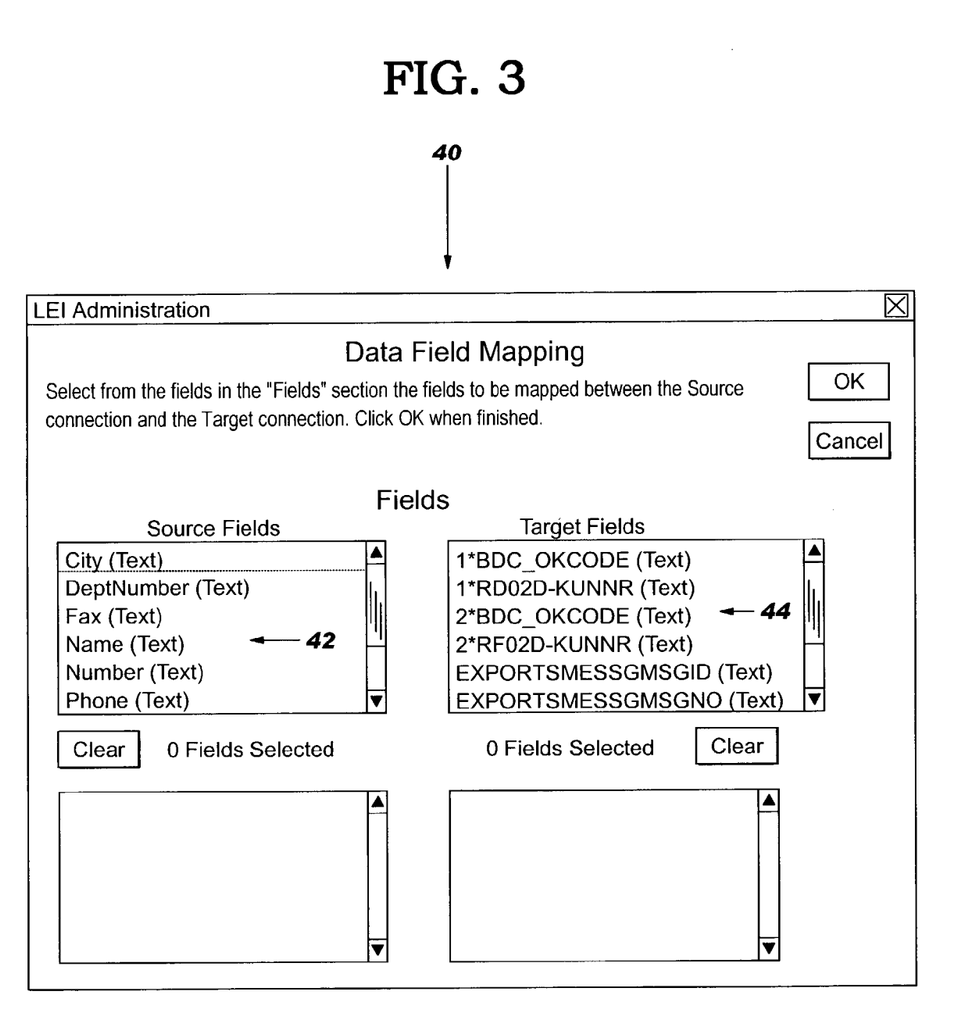
FIG. 3 depicts a mapping interface according to the system of FIG. 1.

Referring to FIG. 3, mapping interface 40 according to the present invention is shown. As depicted, mapping interface 40 shows source data field identifiers 42 and target data field identifiers 44. Modified target field identifiers "1*RF02D-KUNNR" and "2*RF02D-KUNNR" are shown. User 14 can now be aware of the particular instance to which each field identifier corresponds. This allows user 14 to accurately, graphically associate the source data fields to the target data fields based on the field identifiers.

Referring back to FIG. 1, once the mapping has been performed, user 14 will communicate the modified input stream and the mappings to activity system 20 which will obtain/retrieve the data associated with the identified source data fields, and then communicate the data, the modified input stream and/or the mappings to connector system 16. Activity system 20 will also ensure that the activity defined in the input stream is carried out. Thus, if user 14 defined "replication" as the activity, activity system 20 would instruct connector system 16 to "synchronize" the two sides. Alternatively, if user 14 defined "transfer" as the activity, activity system 20 would make a copy of the data from data source 12, and instruct connector system 16 to communicate the same to data target 18. Still yet, if the activity was "archive," the data would be read from data source 12, written to data target 18, and then deleted from data source 12.

In any event, upon receipt of the modified input stream, mappings and data (and any instructions), connector system 16 will return each modified field identifier to its original common value (i.e., its original state). This generally involves removing any values inserted during modification. Thus, the field identifiers "1*RF02D-KUNNR" and "2*RF02D-KUNNR" will be changed back to "RF02D-KUNNR" and "RF02D-KUNNR." The changing back of the modified field identifiers to their original state is so that data target 18 will recognize the target data field identifiers. Specifically, data target 18 is unlikely to be familiar with the modified versions of the target data field identifiers.

Once the target data field identifiers are in their original form (as defined in input stream), the input stream is communicated with the mappings and the data to data target 18. Then, data associated with the defined source fields will be provided to the target data fields to which they were each mapped. To this extent, connector system 16 could communicate the data, the mappings and/or the input stream to data target 18, which will itself fill in the appropriate target data fields. Alternatively, connector system 16 itself could write the data to the appropriate target data fields based on the information and/or instructions received from activity system 20.

In any event, the present invention thus provides a way to non-programmatically map data fields between data source 12 and data target 18. That is, the problems associated with common data field identifiers are resolved without the need for additional program code. Moreover, user 14 can continue to utilize a graphical-based mapping system such as that shown in FIG. 3.

Figure 4:
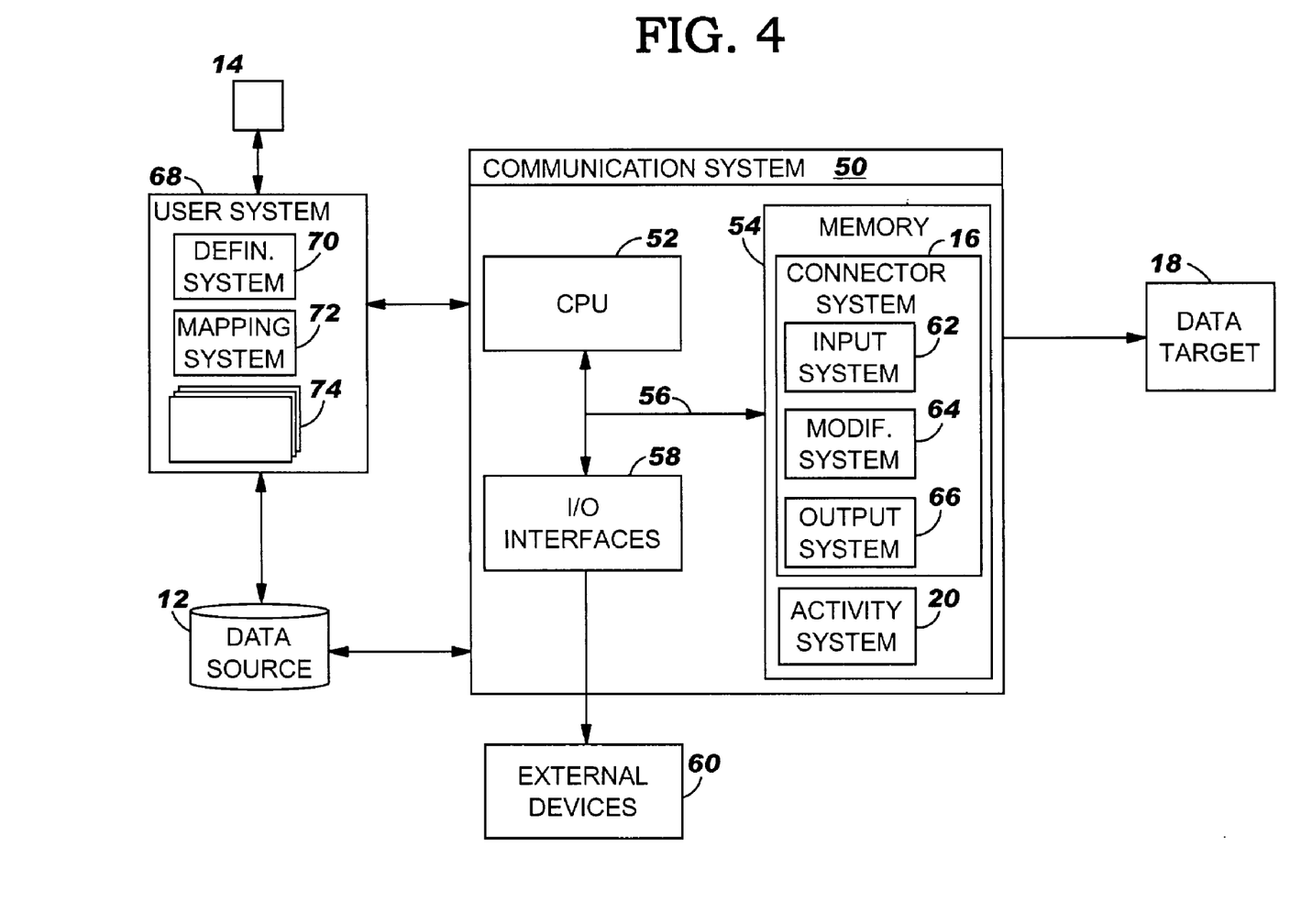
FIG. 4 depicts a computerized implementation of the system of FIG. 1

Referring now to FIG. 4, a computerized implementation of system 10 is shown. In general, FIG. 4 is intended to depict the scenario where data is transferred between data source 12 and data target 18 over a network. To this extent, communication system 50 can be a server that communicates data between data source 12 and data target 18. It should be understood, however, that the implementation shown in FIG. 4 is only one possible implementation of the present invention. For example, communication system 50 could be eliminated and each of the systems thereon could be contained within user system 68. In this scenario, the only necessary intermediary between data source 12 and data target 18 would be user system 68.

In any event, as shown, communication system 50 generally comprises central processing unit (CPU) 52, memory 54, bus 56 input/output (I/O) interfaces 58 and external devices/resources 60. CPU 52 may comprise a single processing unit, or be distributed across one or more processing units in one or more locations, e.g., on a client and server. Memory 54 may comprise any known type of data storage and/or transmission media, including magnetic media, optical media, random access memory (RAM), read-only memory (ROM), a data cache, a data object, etc. Moreover, similar to CPU 52, memory 54 may reside at a single physical location, comprising one or more types of data storage, or be distributed across a plurality of physical systems in various forms.

I/O interfaces 58 may comprise any system for exchanging information to/from an external source. External devices/resources 60 may comprise any known type of external device, including speakers, a CRT, LED screen, hand-held device, keyboard, mouse, voice recognition system, speech output system, printer, monitor, facsimile, pager, etc.. Bus 56 provides a communication link between each of the components in communication system 50 and likewise may comprise any known type of transmission link, including electrical, optical, wireless, etc.. In addition, although not shown, additional components, such as cache memory, communication systems, system software, etc., may be incorporated into communication system 50. It should also be understood that although not shown for brevity purposes, user system 68 can include computerized components (e.g., CPU, memory, bus, I/O Interfaces, external devices, etc.) similar to communication system 50.

Communication between user system 68 and communication system 50 can occur via a direct hardwired connection (e.g., serial port), or via an addressable connection in a client-server (or server-server) environment which may utilize any combination of wireline and/or wireless transmission methods. In the case of the latter, the server and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

As indicated above, data source 12 can be any source of data that utilizes a flat data model. For example, data source 12 could be a relational database that includes one or more storage devices, such as a magnetic disk drive or an optical disk drive. In another embodiment, data source 12 could include data distributed across, for example, a local area network (LAN), wide area network (WAN) or a storage area network (SAN) (not shown). Data source 12 may also be configured in such a way that one of ordinary skill in the art may interpret it to include one or more storage devices. Conversely, data target 18 is typically a system or application that utilizes a non-flat data model. For example data target 18 could be an ERP system such as SAP R/3. It should be understood, however, that the teachings of the present invention could be implemented where data source 12 utilizes a non-flat file data model and data target 18 utilizes a flat data model. To this extent, the teachings described herein address problems associated with common data field identifiers, regardless of whether they are from a data source or a data target.

Shown loaded on user system 68 are definition system 70, mapping system 72 and other systems 74. Definition system 70 can be any program now known or later developed that is used to define the input stream as described above. Mapping system 72 can be any system now known or later developed for (e.g., graphically) mapping source data fields to target data fields. Other systems 74 are intended to represent any other programs that would typically be loaded on user system 68 such as, for example, a data source program, a data target program, etc. To begin the process, user 14 will utilize definition system 70 to identify data source 12, data target 18, source data fields and target data fields in an input stream.

Once defined, the input stream will be communicated to communication system 50 wherein it will be received by input system 62 of connector system 16. Upon receipt, modification system 64 will modify each common field identifier. As indicated above, this generally involves inserting a value into each common field identifier so that each is unique and reflective of its particular instance. Once the field identifiers are modified as necessary, a modified input stream is communicated back to user system 68. Using the field identifiers in the modified input stream, user 14 will map the identified source data fields to the identified target data fields. Once mapping is complete, the modified input stream and mappings will be communicated to activity system 20, which will retrieve/obtain the associated data from data source 12. Then, activity system 20 can communicate the modified input stream, the mappings and/or the data to connector system 16. Upon receipt, modification system 64 will change any modified field identifiers back to their original form. Once changed back to original form, output system 66 will communicate the input stream, the mappings and/or the data to data target 18. Alternatively, as mentioned above, connector system 16 itself could write the data to the appropriate target data fields.

It should be understood that the present invention can be realized in hardware, software, or a combination of hardware and software. Any kind of computer/server system (s)— or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed:

1. A computer implemented method for mapping data fields between a data source and a data target, comprising:
   receiving an input stream from a user, wherein the input stream identifies the data source, the data target and a set of data fields;
   modifying a field identifier for each one of the set of data fields that has a field identifier in common with another one of the set of data fields, the common field identifiers located in the same the data source or data target;

mapping by the user the set of data fields between the data source and the data target after the modifying step; and returning, subsequent to the mapping step, each modified field identifier to its original common value.

2. The method of claim 1, further comprising:

defining an activity for communicating data associated with the set of data fields from the data source to the data target prior to the receiving step; and communicating the data according to the defined activity after the returning step.

3. The method of claim 1, wherein the set of data fields identified in the input stream comprise source data fields and corresponding target data fields.

4. The method of claim 3, wherein the mapping step comprises graphically associating each one of the source data fields with one of the target data fields based on field identifiers after the modifying step.

5. The method of claim 1, wherein the modifying step comprises inserting a unique value into each common field identifier, distinguishing each common field identifier from each other.

6. The method of claim 5, wherein the returning step comprises removing the unique value from each modified field identifier after the mapping step.

7. A computer implemented method for allowing a user to map data fields between a data source and a data target, comprising:

receiving an input stream from a user, wherein the input stream identifies the data source, the data target, source data fields and target data fields;

modifying a field identifier for each one of the target data fields of the data target that has a field identifier in common with another one of the target data fields;

graphically mapping by the user the source data fields to the target data fields after the modifying step; and returning each modified field identifier to its original common value after the graphically mapping step.

8. The method of claim 7, further comprising:

defining an activity for communicating data associated with the source data fields to the target data fields prior to the receiving step; and communicating the data according to the defined activity after the returning step.

9. The method of claim 7, wherein the graphically mapping step comprises graphically associating each one of the source data fields with one of the target data fields based on field identifiers after the modifying step.

10. The method of claim 7, wherein the modifying step comprises inserting a unique value into each common field identifier, distinguishing each common field identifier from each other.

11. The method of claim 10, wherein the returning step comprises removing the unique value from each modified field identifier after the mapping step.

12. A computer implemented system for allowing a user to map data fields between a data source and a data target, comprising:

a processor; and a memory, including a program executable by the processor, the program including:

an input system for receiving a user provided input stream, wherein the input stream identifies the data source, the data target, source data fields and target data fields; and a modification system for modifying a field identifier for each one of the target data fields of the data target that has a field identifier in common with another one of the target data fields, wherein a modified stream containing each modified field identifier is communicated to a system for graphically mapping by the user the source data fields to the target data fields, and wherein each modified field identifier is returned to its original common value after the source data fields are mapped to the target data fields.

13. The system of claim 12, further comprising:

a definition system for defining the input stream; and an activity system for retrieving data associated with the source fields from the data source.

14. The system of claim 12, wherein source data fields are graphically mapped to the target data fields based on field identifiers.

15. The system of claim 12, wherein the modification system inserts a unique value into each common field identifier, distinguishing each common field identifier from each other, and wherein the modification system further removes the inserted unique value after the source data fields are mapped to the target data fields.

16. A computer implemented system for mapping data fields between a data source and a data target, comprising:

a processor; and a memory, including a program executable by the processor, the program including:

a definition system for defining a user provided input stream, wherein the input stream identifies the data source, the data target, source data fields and target data fields;

a connector system for receiving the input stream and for modifying a field identifier for each one of the target data fields of the data target that has a field identifier in common with another one of the target data fields;

a mapping system for receiving a modified input stream that includes each modified field identifier and for mapping by the user the source data fields to the target data fields; and an activity system for receiving the modified input stream and the mapping of the source data fields to the target data fields, wherein the activity system communicates the modified input stream, the mapping of the source data fields to the target data fields and data associated with the source data fields to the connector system, and wherein the connector system returns each modified field identifier to its original common value after the source data fields are mapped to the target data fields.

17. The system of claim 16, wherein source data fields are graphically mapped to the target data fields based on field identifiers.

18. The system of claim 16, wherein the connector system inserts a unique value into each common field identifier, distinguishing each common field identifier from each other, and wherein the connector system further removes the inserted unique value after the source data fields are mapped to the target data fields.

19. The system of claim 16, wherein the connector system further communicates data associated with the source data fields to the data target after returning each modified field identifiers to its original common value.

20. A computer program product stored on a computer readable medium for allowing a user to map data fields between a data source and a data target, which when executed by a computer performs the steps of:

receiving a user provided input stream, wherein the input stream identifies the data source, the data target, source data fields and target data fields; and modifying a field identifier for each one of the target data fields of the data target that has a field identifier in common with another one of the target data fields, receiving a modified stream containing each modified field identifier for graphically mapping by the user the source data fields to the target data fields, and returning each modified field identifier to its original common value after the source data fields are mapped to the target data fields.

21. The computer program product of claim 20, further comprising:

program code for defining the input stream; and program code for retrieving data associated with the source fields from the data source.

22. The computer program product of claim 20, wherein source data fields are graphically mapped to the target data fields based on field identifiers.

23. The computer program product of claim 20, wherein the program code for modifying inserts a unique value into each common field identifier, distinguishing each common field identifier from each other, and wherein the program code for modifying further removes the inserted unique value after the source data fields are mapped to the target data fields.

24. A computer program product stored on a computer readable medium for allowing a user to map data fields between a data source and a data target, which when executed by a computer performs the steps of:

defining a user provided input stream, wherein the input stream identifies the data source, the data target, source data fields and target data fields;

receiving the input stream and for modifying a field identifier for each one of the target data fields of the data target that has a field identifier in common with another one of the target data fields;

receiving a modified input stream that includes each modified field identifier and for mapping by the user the source data fields to the target data fields; and receiving the modified input stream and the mapping of the source data fields to the target data fields, and returning each modified field identifier to its original common value after the source data fields are mapped to the target data fields.

25. The computer program product of claim 24, wherein source data fields are graphically mapped to the target data fields based on field identifiers.

26. The computer program product of claim 24, wherein the program code for modifying inserts a unique value into each common field identifier, distinguishing each common field identifier from each other, and wherein the program code for modifying further removes the inserted unique value after the source data fields are mapped to the target data fields.

27. The computer program product of claim 24, further comprising program code for communicating data associated with the source data fields to the data target.

* * * * *